Jan. 14, 1958

W. VAN DOORN 2,820,205

EQUALIZING NETWORK

Filed Oct. 26, 1954

2 Sheets-Sheet 1

INVENTOR
WILLEM VAN DOORN

BY Fred M. Vogel
AGENT

INVENTOR
WILLEM VAN DOORN
BY Fred M. Vogel
AGENT 2,820,205

United States Patent Office

Patented Jan. 14, 1958

2,820,205

EQUALIZING NETWORK

Willem Van Doorn, Hilversum, Netherlands, assignor, by mesne assignments, to North American Philips Company, Inc., New York, N. Y., a corporation of Delaware Application October 26, 1954, Serial No. 464,756

Claims priority, application Netherlands November 4, 1953

6 Claims. (Cl. 333—28)

The present invention relates to an equalizing network of the type utilized to equalize the damping-frequency characteristic curve of a transmission line. It is more particularly adapted for use in systems for transmitting signals in a wide frequency range, for example carrier-wave telephone signals or television signals, through a coaxial cable and the like. The equalizing network comprises a plurality of adjustable damping branches operating in different frequency-ranges and constituted by shunted T-filters. Each filter comprises inverse impedances in the series branch and parallel branch tuned to a tuning frequency in the frequency-range of the filter, and each filter is shunted by two series-connected shunt resistors. A transverse impedance is connected to the junctions of each of said two series-connected shunt resistors and the T-filter is terminated by a terminating resistor adjustable for damping control.

Such adjustable equalizing networks are used to complete the invariable equalizing networks or level-control apparatus, in wide-range transmission systems. More particularly, they equalize residual level differences in the transmission characteristics curve, which, in general, has a comparatively erratic shape. The accuracy of this after-equalization increases with an increase in the number of T-filters, but this gives rise at the same time, to a corresponding increase in the attenuation in the transmitted frequency band.

An object of the present invention is the provision of a particularly advantageous equalizing network of the type described, in which the aforementioned difficulty is overcome.

According to the invention, for this purpose, a series of T-filters form together a bipole network, since in the first of two successive T-filters operating in different frequency ranges, the shunt resistor connected to the input terminal of this filter is constituted by the second T-filter of the said two filters.

In order to obtain the optimum control-range for each of the T-filters comprising the equalizing network, the input terminal of the first T-filter of the sequence, connected to the adjustable termination resistor, is connected directly to a common line and the corresponding input terminal of each succeeding T-filter is connected through a series circuit having a tuning frequency equal to that of the associated T-filter to said common line. A parallel circuit having a tuning frequency equal to that of the last of the two T-filters is provided between the input terminals of each pair of successive T-filters connected to a shunt resistor. The input terminals of the equalizing network are formed by the input terminal of the first T-filter connected to the adjustable termination resistor and the input terminal of the last T-filter of the sequence connected to a shunt resistor.

The invention will now be described with reference to the accompanying drawing, wherein.

Figures 1, 3A, 3B, 3C, 3D, 3E:
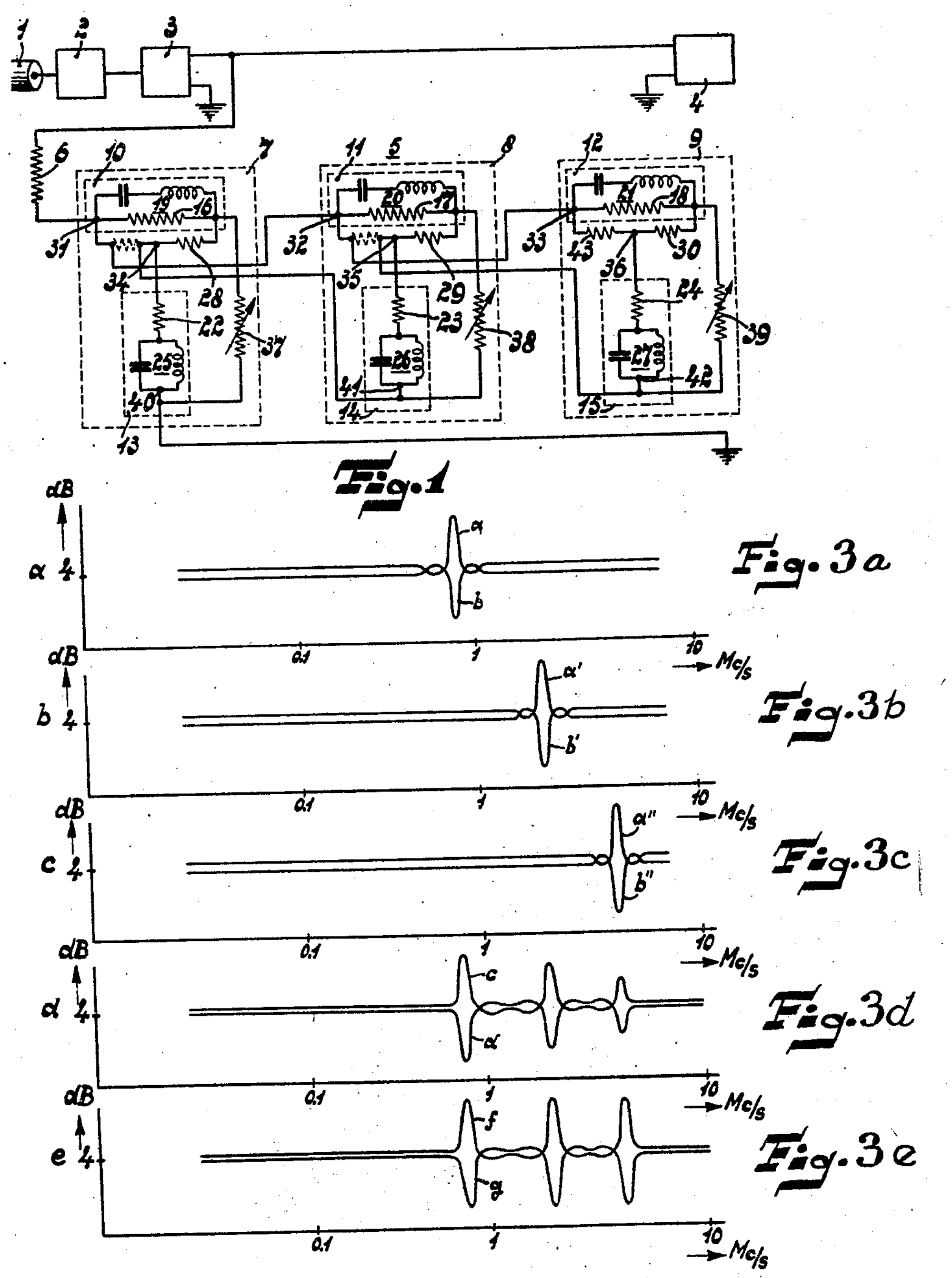
Fig. 1 is a schematic diagram of a terminal station of a carrier-wave telephone system comprising an embodiment of the equalizing network of the present invention.
Figure 2:
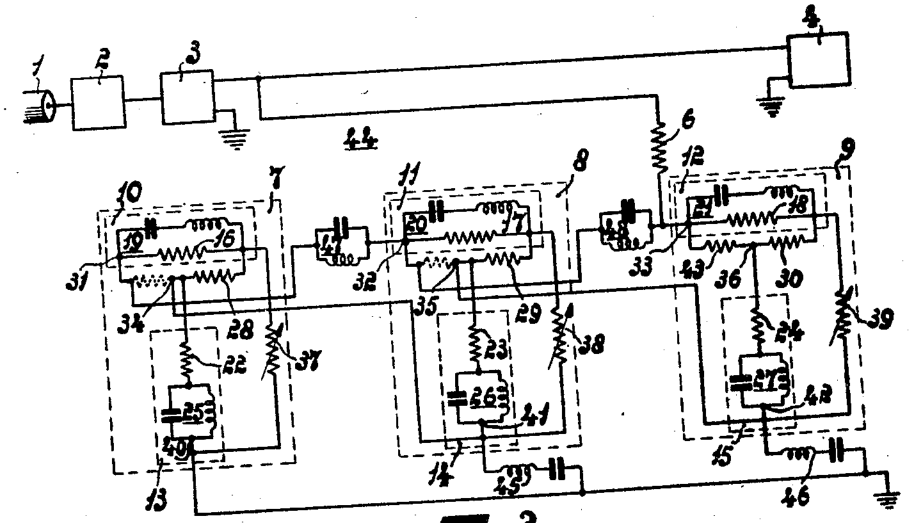
Fig. 2 is a schematic diagram of a terminal station of a carrier-wave telephone system comprising a modification of the equalizing network of Fig. 1.
Figure 4:
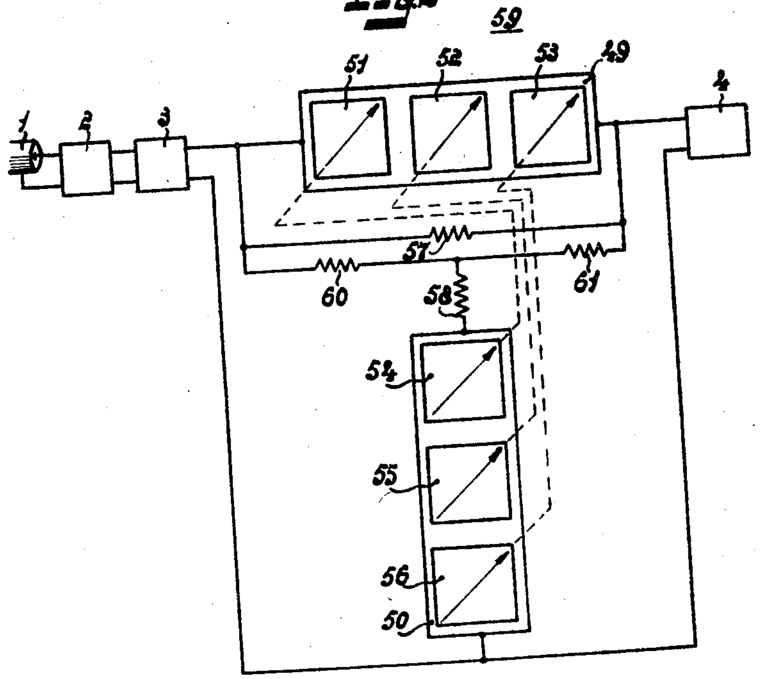

Fig. 3*a* to Fig. 3*e* are a series of damping curves which illustrate the operations of the equalizing networks shown in Figs. 1 and 2; and Fig. 4 is a schematic diagram of a terminal station of a carrier-wave telephone system, comprising another embodiment of the equalizing network of the present invention.

Fig. 1 shows a terminal station of a carrier-wave telephone system designed for the reception of 960 speech channels lying in the frequency band from 60 kilocycles per second to 4 megacycles per second. The carrier-wave telephone signals from a coaxial cable 1 are supplied to a carrier-wave output device 4 through an unvariable equalizing network 2 and a line amplifier 3, comprising a level control system governed by a pilot signal.

In order to reduce residual level differences in the transmitted frequency band, an adjustable equalizing network 5 is provided between the line amplifier 3 and the carrier-wave output device 4; this network is connected in parallel with the transmission line through a series resistor 6. The equalizing network 5 comprises three adjustable damping branches operating in different frequency ranges and constituted by shunted T-filters 7, 8 and 9. Each of the shunted T-filters 7, 8 and 9 is provided with inverse impedances in the series branches 10, 11 and 12, respectively, and in the parallel branches 13, 14 and 15, respectively, said impedances being adjustable to a tuning frequency lying in the frequency range of the damping branch concerned. The series branches 10, 11 and 12 comprise parallel combinations of resistors 16, 17 and 18, respectively, with series circuits 19, 20 and 21, respectively. The parallel branches 13, 14 and 15 comprise series combinations of resistors 22, 23, and 24, respectively, and parallel circuits 25, 26 and 27, respectively. The tuning frequencies of the shunted T-filters 7, 8 and 9 in the embodiment of Fig. 1 are about 0.79 megacycle per second, 1.7 megacycles per second and 3.5 megacycles per second, respectively.

In the shunted T-filters 7, 8 and 9 the series branches 10, 11 and 12 are shunted by the series combinations of shunt resistors 28, 29 and 30 and shunt resistors connected to the input terminals 31, 32 and 33, respectively. The parallel impedances 13, 14 and 15 are connected to the respective junctions 34, 35 and 36 of the series shunts. Each of the T-filters 7, 8 and 9 is terminated by a terminating resistor 37, 38 and 39, respectively, adjustable for damping control.

Fig. 3*a* to Fig. 3*e* are a series of damping curves which illustrate the operations of the equalizing networks shown in Figs. 1 and 2. Figs. 3*a*, 3*b* and 3*c* indicate the damping in decibels versus the frequency in megacycles per second of each of the shunted T-filters 7, 8 and 9 measured between the input terminals 31—40, 32—41 and 33—42 in dependence upon the logarithm of the frequency at different values of the terminating resistors 37, 38 and 39; the curves $a$, $a'$, $a''$, of these figures, and the curves $b$, $b'$, $b''$, of these figures, indicate the damping of said T-filters at an infinite value and at a zero value, respectively, of the terminating resistors 37, 38 and 39.

From Figs. 3*a*, 3*b* and 3*c* it is evident that in the frequency range divisions of said T-filters the damping may be adjusted between about 0.8 db and about 7.2 db, whereas beyond these values each of said T-filters introduces an additional damping, the so-called zero damping, of about 4 db.

In order to obtain a minimum zero damping of the equalizing network 5, the sequence of T-filters 7, 8 and 9 constitutes, in accordance with the invention, a bipole network, since in the first of two successive T-filters 7, 8 and 9 operating in different ranges the shunt resistor connected to the input terminals 31, 32 is constituted substantially by the second filter of the said pair of filters. The shunt resistor connected to the input terminal 33 of the last T-filter 9 of the sequence is constituted by a resistor 43.

The replacement of the shunt resistors (shown in broken lines in Figs. 1 and 2) connected to the input terminals 31, 32, by the subsequent T-filters 8, 9, is possible because the input impedance of these T-filters beyond the associated frequency range (cf. Figs. 3*b* and 3*c*) is constant and substantially independent of the values of their adjustable terminating resistors 38 and 39, respectively. Thus at the input terminals of the sequence, constituted by the input terminals 31—40 of the first T-filter 7, a zero damping equal to the zero damping of the T-filter 7 occurs.

Fig. 3*d* shows the damping in decibels versus the frequency in megacycles per second of the equalizing network 5 in accordance with the logarithm of the frequency. The curves *c* and *d* of Fig. 3*d* indicate the damping at an infinite value and at a zero value, respectively, of the termination resistors 37, 38 and 39. The zero damping of the equalizing network 5 is about 4 decibels in the embodiment of Fig. 1.

The control-range of the T-filters 8 and 9 has decreased owing to the special construction of the T-filters, since the frequency range in which the T-filter concerned operates is reduced in addition in the preceding T-filters. Under particular conditions, for example if use is made of a great number of T-filters in the equalizing network 5, it may be desirable that each of the component T-filters should have an optimum control-range, which may be achieved in the manner shown in Fig. 2.

Fig. 2 is a schematic diagram of a terminal station of a carrier-wave telephone system comprising a modification of the equalizing network of Fig. 1. Corresponding elements of Fig. 2 are designated by the same reference numers as in Fig. 1.

The adjustable equalizing network 44 of Fig. 2 is distinguished from the equalizing network 5 of Fig. 1 in that the input terminal 40 of the first T-filter 7 of the network 44 is connected to the adjustable terminating resistor 37 and is connected directly to a common line. The corresponding input terminals 41 and 42 of the subsequent T-filters 8 and 9, respectively, are connected through series circuits 45 and 46, respectively, to said common line. The series circuits 45 and 46 have frequencies equal to those of their associated T-filters. Parallel circuits 47 and 48, each having a tuning frequency equal to that of the last filter of the two successive T-filters, are provided between the input terminals 31 and 32, and 32 and 33, respectively, each being connected to a shunt resistor of two successive T-filters. The input terminals of the equalizing network 44 are constituted by the input terminal 33 connected to a shunt resistor of the last T-filter 9 and the input terminal 40 of the first T-filter 7 of the sequence. The tuning frequencies of the circuits 45, 47 and 46, 48 thus correspond to the tuning frequencies of the T-filters 8 and 9 of about 1.5 and about 3.5 megacycles per second, respectively.

In Fig. 2 the parallel circuits 47 and 48 constitute very high impedances for oscillations having a frequency corresponding to the tuning frequencies of the T-filters 8 and 9, whereas for these frequencies the input terminals 41 and 42 of the T-filters 8 and 9, respectively, are connected directly to ground through the series circuits 45 and 46. The circuits 45, 47 and 46, 48 operate in this instance as switches to cut out of operation the preceding T-filters for the frequency at which a T-filter is operative. A reduction of this frequency owing to the preceding T-filter is thus avoided, so that an optimum control-range is obtained for each of the T-filters.

Fig. 3*e* shows the damping characteristic curve of the damping in decibels versus the frequency in megacycles per second of the equalizing network 44 of Fig. 2. The curves *f* and *g* of Fig. 3*e* indicate the damping at an infinite value and at a zero value of the adjustable terminating resistors 37, 38 and 39. The damping of each of the shunted T-filters is adjustable between about 0.9 and about 7.1 db.

If use is made of the equalizing networks 5 and 44 shown in Figs. 1 and 2 respectively, it is desirable, in order to avoid relative influence of the component T-filters, that between the tuning frequencies of the T-filters there should be a certain frequency interval which may for example be three times the foot width of the T-filters used in the embodiment shown. If it is desired to equalize level differences in these frequency intervals, the T-filters concerned may be arranged in a separate sequence; these sequences must then be separated from one another by a separating stage such as a line amplifier, for example.

Fig. 4 is a schematic diagram of a terminal station of a carrier-wave telephone system comprising another embodiment of the equalizing network of the present invention. Corresponding elements of Fig. 4 are designated by the same reference numerals as in Fig. 1.

In Fig. 4 the equalizing network comprises two sequences of T-filters 49 and 50, each having three T-filters 51, 52 and 53, and 54, 55 and 56 respectively, which constitute bipole networks in the manner described with reference to Figs. 1 and 2. The tuning frequencies of the T-filters 51, 52 and 53 of the sequence 49 are equal to the tuning frequencies of the T-filters 54, 55 and 56 of the sequence 50 and may, for example, be about 0.79 megacycle per second, about 1.7 megacycles per second and about 3.5 megacycles per second, respectively.

A resistor 57 is connected in parallel with the sequence 49 and a resistor 58 is connected in series with the sequence 50. The networks 49, 57 and 50, 58, thus formed, constitute the series branch and the parallel branch of the shunted T-filter 59. The shunt resistors of the shunted T-filter 59 are designated by 60 and 61, respectively.

In order to obtain a constant input impedance, which is of particular advantage for various purposes, the networks 49, 57 and 50, 58 constitute relatively inverse impedances. The terminating resistors of the T-filters of the two sequences 49 and 50, being adjustable for damping control, are varied in an inverse sense. This may be carried out by means of a mechanical clutch as indicated by broken lines in Fig. 4. The T-filters must then be proportioned to be such that the product of a shunt resistor of a T-filter of the sequence 49 and a shunt resistor of a corresponding T-filter of the sequence 50 is equal to the square of the shunt resistor 60 or 61, respectively, of the network 59.

An appreciable simplification of the equalizing network 59 is obtained by making the shunt resistors of the filters of the sequences 49 and 50 equal to the shunt resistors 60 and 61, respectively; it is thus insured that one T-filter of the sequence 49 is equal to a corresponding T-filter of the sequence 50.

The constant input impedance of the network 59 permits a cascade connection of two or more of the networks 59, the tuning frequencies of the component T-filters of which exhibit only little difference without a relative reaction between said networks. Provision must be made for a sufficient frequency interval between the tuning frequencies of the T-filters of one sequence.

It should be noted that the terminating resistors of the T-filters, which are adjustable for damping control, may be constituted by thermistors, controlled in accordance with a pilot signal transmitted with the signals.

What is claimed is:

1. An equalizing network for level control of a transmitted signal in a coaxial cable having an inner conductor and an outer conductor comprising a plurality of damping branches connected in parallel with said cable, each of said damping branches comprising a series branch and an associated parallel branch, each said series branch being the inverse impedance of its associated parallel branch, each of said damping branches operating in a different frequency range, each said impedance being tunable to a frequency within the operating range of its damping branch, means for connecting one of said series branches to a conductor of said cable, a shunt branch connected across each said series branch comprising a shunt resistor in series-connection with the resistance of the next succeeding damping branch, means for including the resistance of each said damping branch in the shunt branch of the next preceding damping branch, the shunt branch of the last said damping branch comprising two series-connected shunt resistors, means for connecting each said parallel branch to its associated shunt branch, means for connecting one of said parallel branches to the other conductor of said cable, and a terminating resistor adjustable for damping control connected between each said series branch and its associated parallel branch.

2. An equalizing network for level control of a transmitted signal in a coaxial cable having an inner conductor and an outer conductor comprising a plurality of damping branches connected in parallel with said cable, each of said damping branches comprising a series branch having an input terminal and an output terminal and an associated parallel branch having an input terminal and a junction terminal, each said series branch being the inverse impedance of its associated parallel branch, each of said damping branches operating in a different frequency range, each said impedance being tunable to a frequency within the operating range of its damping branch, means for connecting the input terminal of one of said series branches to a conductor of said cable, means for connecting the input terminal of each said series branch to the input terminal of the next succeeding series branch, means for connecting the junction terminal of each said parallel branch to the input terminal of the next succeeding parallel branch, means for connecting the input terminal of the first of said parallel branches to the other conductor of said cable, a shunt resistor connected between the output terminal of each said series branch and the junction terminal of its assoicated parallel branch, a second shunt resistor connected between the input terminal of the last of said series branches and the junction terminal of its associated parallel branch, and a terminating resistor adjustable for damping control connected between the output terminal of each said series branch and the input terminal of its associated parallel branch.

3. An equalizing network for level control of a transmitted signal in a coaxial cable having an inner conductor and an outer conductor comprising a plurality of damping branches connected in parallel with said cable, each of said damping branches comprising a series branch having an input terminal and an output terminal and an associated parallel branch having an input terminal and a junction terminal, each said series branch being the inverse imepdance of its associated parallel branch, each of said damping branches operating in a different frequency range, each said impedance being tunable to a frequency within the operating range of its damping branch, means for connecting the input terminal of the first of said series branches to a conductor of said cable, means for connecting the input terminal of each said series branch to the input terminal of the next succeeding series branch, means for connecting the junction terminal of each said parallel branch to the input terminal of the next succeeding parallel branch, means for connecting the input terminal of the first of said parallel branches to the other conductor of said cable, a shunt resistor connected between the output terminal of each said series branch and the junction terminal of its associated parallel branch, a second shunt resistor connected between the input terminal of the last of said series branches and the junction terminal of its associted parallel branch, and a terminating resistor adjustable for damping control connected between the output terminal of each said series branch and the input terminal of its associated parallel branch.

4. An equalizing network for level control of a transmitted signal in a coaxial cable having an inner conductor and an outer conductor comprising a plurality of damping branches connected in parallel with said cable, each of said damping branches comprising a series branch having an input terminal and an output terminal and an associated parallel branch having an input terminal and a junction terminal, each said series branch being the inverse impedance of its associated parallel branch, each of said damping branches operating in a different frequency range, each said impedance being tunable to a frequency within the operating range of its damping branch, a common line connected to a conductor of said cable, means for directly connecting the input terminal of the first of said parallel branches to said common line, means for connecting the input terminal of each succeeding parallel branch to said common line comprising a series circuit having a tuning frequency equal to the tuning frequency of its damping branch connected between each said parallel branch input terminal and said common line, means for connecting the input terminal of each said series branch to the input terminal of the next succeeding series branch comprising a parallel circuit having a tuning frequency equal to the tuning frequency of the next succeeding damping branch connected between each said series branch input terminal and each said succeeding series branch input terminal, means for connecting the junction terminal of each said parallel branch to the input terminal of the next succeeding parallel branch, means for connecting the input terminal of the last of said series branches to the other conductor of said cable, a shunt resistor connected between the output terminal of each said series branch and the junction terminal of its associated parallel branch, a second shunt resistor connected between the input terminal of the last of said series branches and the junction terminal of its associated parallel branch, and a terminating resistor adjustable for damping control connected between the output terminal of each said series branch and the input terminal of its associated parallel branch.

5. An equalizing network for level control of a transmitted signal in a coaxial cable having an inner conductor and an outer conductor comprising a sequential series branch connected in series with the inner conductor of said cable having an input terminal and an output terminal and an associated sequential parallel branch having an input terminal and a junction terminal, said sequential series branch being the inverse impedance of its associated sequential parallel branch, a shunt resistor connected between the input terminal of said sequential series branch and the junction terminal of said parallel branch, a shunt resistor connected between the output terminal of said sequential series branch and the said junction terminal, a parallel resistor shunted across said shunt resistors connected between the input terminal and the output terminal of said sequential series branch, means for connecting the input terminal of said sequential parallel branch to the outer conductor of said cable, said sequential series branch and said sequential parallel branch each comprising a plurality of damping branches each comprising a series branch and an associated parallel branch, each said series branch being the inverse impedance of its associated parallel branch, each of said damping branches operating in a different frequency range, each said impedance being tunable to a frequency within the operating range of its damping branch, means for connecting one of said series branches to a conductor of said cable, a shunt branch connected across each said series branch comprising a shunt resistor in series-connection with the resistance of the next succeeding damping branch, means for including the resistance of each said damping branch in the shunt branch of the next preceding damping branch, the shunt branch of the last said damping branch comprising two series-connected shunt resistors, means for connecting each said parallel branch to its associated shunt branch, and a terminating resistor adjustable for damping control connected between each said series branch and its associated parallel branch, means for connecting one of the parallel branches of said sequential series branch to the said conductor of said cable, means for connecting one of the parallel branches of said sequential parallel branch to the other conductor of said cable, and means for controlling the terminating resistors of the damping branches of said sequential series branch and the corresponding terminating resistors of the damping branches of said sequential parallel branch in an inverse sense.

6. An equalizing network as claimed in claim 5, wherein the resistances of the shunt branches of said damping branches are equal to the resistances of the shunt resistors of said sequential series branch.

References Cited in the file of this patent

UNITED STATES PATENTS

| | | |
|---|---|---|
| 2,044,047 | Bobis | June 16, 1936 |
| 2,153,743 | Darlington | Apr. 11, 1939 |